Patented Dec. 12, 1939

2,182,965

UNITED STATES PATENT OFFICE 2,182,965

PROCESS FOR TREATING FRUIT

John P. Ioannu, Philadelphia, Pa.

No Drawing. Application October 8, 1937,
Serial No. 168,009

6 Claims. (Cl. 99—103)

My invention refers to a process for treating fresh fruit in order to alter the natural color or appearance of the fruit and also to protect it from decay.

The fresh fruit received at the packing houses seldom is of uniform color due to numerous factors affecting its growth and maturity. Thus, the color of physiologically mature oranges may vary from a rich orange color to yellow and green color, depending, among other things, on the weather conditions during the harvesting time. Even with ideal weather conditions the produce or fruit is not uniform in color due to factors well understood by those skilled in the art of fruit growing although the produce is ripe. To improve the uniformity of color and to enhance the commercial appearance, the fruit is generally submitted to a lengthy treatment with mainly ethylene containing gases or to any other artificial coloring by suitable dyestuffs. Obviously, a dyestuff cannot cover entirely the color irregularities of the surface of the fruit. The improved appearance of artificially color added oranges is not altogether satisfactory as other factors hereinafter set forth have not heretofore been considered.

It is an object of my invention to provide a process of treating fruit which improves the natural color of the fruit.

Another object of my invention is to uniformly color the surface of the fruit.

Another object of my invention is to provide a process by which the color variations of the surface of the fruit will be made uniform, or which renders the surface suitable for a dye material.

Still another object of my invention is to avoid exposing the fruit to lengthy periods of treatment by devising a process for coloring fruit which will consume a small amount of time.

Still another object of my invention is to avoid submitting the fruit to conditions promoting the germination and growth of phytoparasites by devising a process, operating under such conditions of moisture and temperature as are inimical or hostile to such growths.

A further object of my invention is to provide a process and treatment for fresh fruits which besides improving the color uniformity of the treated fruit protects the fruit against moulds and the phytoparasites which results in decay to the fruit.

It was found that by exposing physiologically ripe fruits discolored by the presence of chlorophyllic areas on their surfaces to the combined treatment of an oxygenated sulphur derivative and an aldehydic compound capable of reacting with said sulphur derivative under selective acidic, neutral or alkaline conditions, that the appearance of the fruit is improved so that it becomes attractive and assumes a uniform natural color.

Furthermore, it has been found that with the combined action of the aforementioned two types of compounds but a very short time of treatment of the fruit is necessary for obtaining satisfactory results.

Further, the hereinafter disclosed process prepares the fruits particularly suitable for a secondary dyestuff treatment. By adding dyestuff color to treated fruits, color results are obtained of an uniformity herebefore unobtainable with the untreated fruits.

In practice my invention is utilized by first subjecting the fresh fruit exemplified by citrus fruits, such as oranges, to the preliminary treatment of washing and rendering the surface wettable and is then submitted to the action of an oxygenated sulphur compound.

Sulphurous acid anhydride was found, among other sulphur compounds, convenient and suitable for the present treatment. It can be applied to the fruit in solution and preferably in gaseous form. It can be prepared by several known methods such as by sulphur burning or by displacement by means of an acid from a number of available sulphur derivatives.

An alternative method of applying the sulphur dioxide treatment to the fruit, particularly favored for installations lacking the proper equipment for a gaseous treatment, is the preparation of a solution of suitable sulphur salts such as the alkali sulphites and the soluble acid sulphites, preferably buffered by appropriate salts of low ionization acids such as phosphates, acetates, borates and the like. By adjusting the acidity of the solution and stabilizing it by the addition of said buffer salts the sulphurous acid anhydride content is maintained at the proper concentration for the needs of the present treatment. Between gaseous and liquid form of treatments, a selection may be made to take advantage of manipulation accommodations and without differentiation as to the results of the treatment.

The fruit after exposure to the action of an oxygenated sulphur compound is treated subsequently with an aldehyde, generally represented by R—CHO in which R represents an aliphatic or an aromatic radical. Examples of such compounds are methanal, ethanal, propanal, benzaldehyde, phenolic aldehydes and the like. The selection of a suitable aldehydic compound will depend primarily upon the ability of its aldehydic function to combine with and form a sulphur derivative and it also may be made with the further object of increasing the fungicidal and protective properties of the compounds formed on the surface of the fruit. Thus, for example, methanal is of well known protective merit due solely to its aldehydic function, while benzaldehyde and the phenolic aldehydes contribute also their benzoic and phenolic acid radicals thus increasing the active constituents added on the surface of the fruit. The selection of the proper aldehydic compound will be further decided according to the exigencies of the particular fruit shipment which are dependent upon varietal climatic and infection conditions. The term "aldehydic compounds" designates all substances known as aldehydes and also all organic compounds containing aldehydic groups capable of reacting with sulfur compounds.

The aldehyde treatment is applied to the surface of the fruit by any suitable method such as submersion, spraying or preferentially by exposing to the action of gaseous aldehydes which is capable of insuring a good reaction with the sulphur derivatives. It has been found that the sulphur-aldehyde complex compounds formed on the surface of the fruit are of greater decolorizing activity and at the same time of increased fungicidal and protective activity than any of the compounds used in the present combined treatment when taken alone. Furthermore, it seems that the combined treatment prevents the naturally easily oxidizable sulphite and sulphur derivatives from forming acidic compounds on the surface of the treated fruits and therefore the combined treatment prevents discoloration and skin injuries due to sulphur burns.

To promote the interaction of the sulphur and aldehydic derivatives used in this treatment and to insure the activity, stability and final form of the sulphur-aldehyde complex on the fruit, the reaction may be made to take place in acidic, neutral or alkaline medium by a suitable stabilization of the prevailing hydrogen and/or hydroxyl ion concentration at the proper washing places. The reaction adjustments are made by the use of means known to those skilled in the art; thus for an alkaline medium any of the available alkalies may be used such as ammonia, caustic soda, the carbonates, phosphates, borates and the like; for an acidic medium any of the commercially available acids may be used.

The fruit is exposed to the present treatment for a length of time variable from a few minutes up to sixty minutes and may be further varied depending from the concentration of reagents used and more particularly depending from the species, varietal characteristics, and results desired for each shipment of fruits received.

The temperature preferred for the treatment is the room temperature although it may be increased especially when submersion reagents are used, provided the temperature does not reach the boiling point of the submersion reagents nor be allowed to reach points that will produce heat injuries on the fruits. Obviously, when a gaseous treatment is used, the reagents may be heated as needed to promote their vaporization.

Example 1

Physiologically ripe oranges presenting large green areas are processed as usual by washing and dewaxing and then are exposed when still water wet to the fumes of sulphur dioxide until substantially 25% of the green color is toned down. The fruit is then washed by submersion in ammonia water and immediately exposed to the fumes of formaldehyde. The green areas are transformed into natural yellow color to the extent of 99% and the treated fruit is of substantially of a uniform, attractive, intensified natural light color. The fruit is then prepared for packing by any usual oil-wax application to minimize the loss from excessive evaporation. If desired, a color may be added prior to or simultaneously with the oil-wax application. The color added fruit presents a uniform color appearance unobtainable with the untreated fruits.

Example 2

Ripe oranges with large green areas are first processed the usual ways by cleaning and rendering them wettable, and then are exposed to the fumes of sulphur dioxide until the green discoloration is reduced by nearly 30%. The fruits are then sprayed with a weak caustic soda solution until the fruit surface becomes distinctly alkaline. The fruits are subsequently exposed to the fumes of benzaldehyde until the green color is nearly removed by being transformed to natural yellow color suitable for marketing. The fruit is then oil-waxed and packed. The treated fruit may be submitted also to a complementary dyeing operation, if desired.

Example 3

Ripe oranges discolored by the presence of green areas after the usual cleaning and dewaxing treatments are sprayed with a solution of alkali sulphite made distinctly alkaline by the addition of caustic soda and of such strength that will condition the fruit by removing 30% of the green color in less than 8 minutes. The fruit from the sulphite bath is exposed to the fumes of 40% formaldehyde until a 100% of the green discoloration is transformed into natural yellow color. The fruit presenting now a natural light color is subsequently processed the usual ways for packing and shipping.

Example 4

Green unripe bananas were exposed to the fumes of sulphur dioxide nearly saturated with water vapor at room temperature and for nearly five minutes with the result that substantially 20% of the green color is removed. The fruit was then exposed to ammonia fumes for a short time until the reaction on the skin of the fruit became faintly alkaline. The bananas thus treated were exposed to the fumes emanating from a slightly heated 40% commercial formaldehyde until substantially all the green color is transformed into a light yellow color. The fruits treated are left to mature the usual way and can be disposed in the market free from phytoparasites and spoilage. For practical purposes it is not advisable nor necessary to submit the fruits to a treatment transforming the totality of green color as a substantially lighter treatment transforming only a small proportion of green to light yellow is sufficient for preservation and for marketing.

It is to be noted, that the hereinbefore described processes are only examples of particular applications of this process of treating fruits and are not given with the object of limiting the broad application of the principles of the present discovery.

It is to be noted also that the strength of the reagent solutions must be varied to suit the particular conditions of the fruits to be treated. By adjusting the strength of the reagents and the reaction time the uniformity of appearance of the treated fruit is insured independently of its condition at the time the treatment is commenced.

Furthermore, it is to be noted that although mainly oranges were mentioned as fruits suitable for the operative variations exemplifying the present invention, all citrus fruits and furthermore, all fruits presenting green chlorophyllic cells and/or surfaces are suitable and can be advantageously treated by the herewith disclosed combined treatment.

Furthermore, the degree and/or intensity of the treatments may be modified by those skilled in the art so as to render them adaptable to the exigencies of particular fruits and to take care of varietal susceptibilities without departing from the scope of my invention.

Although my invention has been described in considerable detail, such description is intended as illustrative rather than limiting, since the invention may be variously embodied, and the scope of the invention is to be determined as claimed.

I claim as my invention:

1. A process for intensifying the color of fresh citrus fruits comprising the steps of treating the fruits with sulphur dioxide, then treating said fruits with an alkaline compound capable of lowering the acidity of the surface of the fruit, and then treating said fruits with an aldehyde compound capable of reacting with the compounds formed on the surface of the fruit by the previous treatment with the said sulphur and said alkali derivatives.

2. A process for intensifying the color of fresh citrus fruits comprising the steps of exposing the surface of the fruits to the action of gaseous sulphur dioxide, exposing the aforementioned treated fruit to the action of a gaseous alkaline compound capable of lowering the acidity of the surface of the fruit, and treating said aforementioned treated fruit to the action of a gaseous aldehydic compound capable of reacting with the compounds formed on the surface of the fruit by said previous steps of treatment with said sulphur and said alkali compounds.

3. A process for intensifying the color of fresh citrus fruits comprising the steps of exposing the surface of the fruit to the action of a solution of sulphur dioxide, then subjecting the treated fruit to the action of a solution of an alkaline compound capable of lowering the acidity of the surface of the fruit, and subjecting the treated fruit to the action of a solution of an aldehydic compound capable of reacting with the compounds formed on the surface of the fruit by said previous steps of treatment with said sulphur and said alkali compounds.

4. A process for intensifying the natural color of ripe citrus fresh fruits comprising the steps of exposing the fruit to the action of sulphur dioxide, then to the action of ammonia, and then to the action of an aldehydic compound to intensify the color of the fruit.

5. A process for intensifying the natural color of ripe fresh citrus fruits comprising the steps of exposing the fruit to the action of sulphur dioxide, then to the action of a solution of alkali carbonate, and then to the action of an aldehydic compound to intensify the color of the fruit.

6. A process for intensifying the natural color of fresh citrus fruit comprising the steps of exposing the fruit to the action of sulphur dioxide, then to the action of an alkali capable of neutralizing any acidity on the surface of the fruit, and then to the action of formaldehyde to intensify the color of the fruit.

JOHN P. IOANNU.